(12) United States Patent
Asano et al.

(10) Patent No.: US 6,903,887 B2
(45) Date of Patent: Jun. 7, 2005

(54) MULTIPLE LEVEL (ML), INTEGRATED SECTOR FORMAT (ISF), ERROR CORRECTION CODE (ECC) ENCODING AND DECODING PROCESSES FOR DATA STORAGE OR COMMUNICATION DEVICES AND SYSTEMS

(75) Inventors: Hideo Asano, Machida (JP); Martin Aureliano Hassner, Mountain View, CA (US); Nyles Norbert Heise, San Jose, CA (US); Tetsuya Tamura, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 10/040,115

(22) Filed: Jan. 3, 2002

(65) Prior Publication Data

US 2003/0147167 A1 Aug. 7, 2003

(51) Int. Cl.[7] .............................. G11B 5/09; G11B 27/36
(52) U.S. Cl. .............................. 360/31; 360/53; 360/54; 360/48; 360/49; 714/704; 714/708
(58) Field of Search ................................ 360/31, 53–54, 360/48–49, 62, 25, 39, 55, 72.1; 714/704, 708, 752, 758, 763, 769, 770

(56) References Cited

U.S. PATENT DOCUMENTS

| | | | |
|---|---|---|---|
| 5,719,885 A | * | 2/1998 | Ofer et al. ........................ 714/6 |
| 5,864,440 A | * | 1/1999 | Hashimoto et al. ............ 360/53 |
| 5,946,328 A | | 8/1999 | Cox et al. ................. 371/37.11 |
| 6,163,871 A | * | 12/2000 | Yang ............................ 714/769 |
| 6,239,931 B1 | * | 5/2001 | Chung et al. .................. 360/53 |
| 6,405,342 B1 | * | 6/2002 | Lee ............................... 714/792 |
| 6,496,311 B1 | * | 12/2002 | Sato et al. ....................... 360/8 |
| 6,519,715 B1 | * | 2/2003 | Takashi et al. ................ 714/32 |

FOREIGN PATENT DOCUMENTS

EP           481752 A1 *  4/1992   .......... H03M/13/00

\* cited by examiner

*Primary Examiner*—Sinh Tran
*Assistant Examiner*—Natalia Figueroa
(74) *Attorney, Agent, or Firm*—Kevin Kaschke; Marc D. McSwain

(57) ABSTRACT

A method and an apparatus encodes and decodes blocks having a predetermined number of sectors of data bytes to detect and correct data bytes in error in each sector of a block. The method and the apparatus generates sector level check bytes for each sector in the block responsive to the data bytes in each sector according to a first level of an error correction code, and generates block level check bytes for a predetermined sector in the block responsive to the sector level check bytes of various sectors, including the predetermined sector, according to at least a second level of the error correction code. The method and apparatus processes the block to detect and correct data bytes in error in each sector within the capability of the sector level check bytes, to detect and correct data bytes in error in the at least two sectors that exceed the correction capability of the sector level check bytes but within the correction capability of the block level check bytes, or to indicate that the data bytes in error in the at least two sectors exceed the correction capability of each of the sector level check bytes and the block level check bytes. The method and apparatus improves signal quality for long streams of information having multiple sequential physical blocks of data bytes, such as audio visual information, with a low check byte overhead while being compatible with conventional 512 data byte sized sectors and conventional single sector error correction code processes.

4 Claims, 11 Drawing Sheets

PARTIAL READ AND WRITE PATH DATA FLOW
IN A DIRECT ACCESS STORAGE DEVICE

CHECK EQUATIONS $$\underline{r}_1 = \underline{r}_{11}''$$

$$\underline{r}_a = \sum_{i=1}^{2} \underline{r}_{i2}', \quad \underline{r}_2 = \underline{r}_{11}'' + \sum_{i=1}^{2} \underline{r}_{i2}''$$

$$\underline{r}_3 = \underline{r}_{31}''$$

$$\underline{r}_c = \sum_{i=1}^{4} \underline{r}_{i3}, \quad \underline{r}_b = \sum_{i=1}^{2} \underline{r}_{i2}' + \sum_{i=1}^{4} \underline{r}_{i3}'$$

$$\underline{r}_4 = \underline{r}_1 + \underline{r}_2 + \underline{r}_3 + \sum_{i=1}^{4} \underline{r}_{i3}''$$

MULTI-LEVEL ENCODER $$\overline{M}_4 = \boxed{\underline{m}_1 \mid \underline{r}_1}$$
$$\underline{r}_{11}'' \Rightarrow \underline{r}_1$$

$$\overline{M}_2 = \boxed{\underline{m}_2 \mid \underline{r}_a \mid \underline{r}_2}$$
$$\sum_{i=1}^{2}\underline{r}_{i2}', \sum_{i=1}^{2}\underline{r}_{i2}'' \Rightarrow \underline{r}_a, \underline{r}_2$$

$$\overline{M}_6 = \boxed{\underline{m}_3 \mid \underline{r}_3}$$
$$\underline{r}_{31}'' \Rightarrow \underline{r}_3$$

$$\overline{M}_1 = \boxed{\underline{m}_4 \mid \underline{r}_c \mid \underline{r}_b \mid \underline{r}_4}$$
$$\sum_{i=1}^{4}\underline{r}_{i3}, \sum_{i=1}^{4}\underline{r}_{i3}'' \Rightarrow \underline{r}_c, \underline{r}_b, \underline{r}_4$$

INTEGRATED 4-SECTOR FORMAT

| $\underline{m}_1$ | $\underline{r}_1$ | $\underline{m}_2$ | $\underline{r}_a$ | $\underline{r}_2$ | $\underline{m}_3$ | $\underline{r}_3$ | $\underline{m}_4$ | $\underline{r}_c$ | $\underline{r}_b$ | $\underline{r}_4$ |

$C_1 \subset C_1$  $C_2 \subset C_1$  $C_3 \subset C_1$  $C_4 \subset C_1$ $C_1 + C_2 \subset C_1$    $C_3 + C_4 \subset C_2 \subset C_1$ $C_1 + C_2 + C_3 + C_4 \subset C_3 \subset C_2 \subset C_1$

FIG. 3B

MULTI-LEVEL
ENCODER ALGORITHM
700

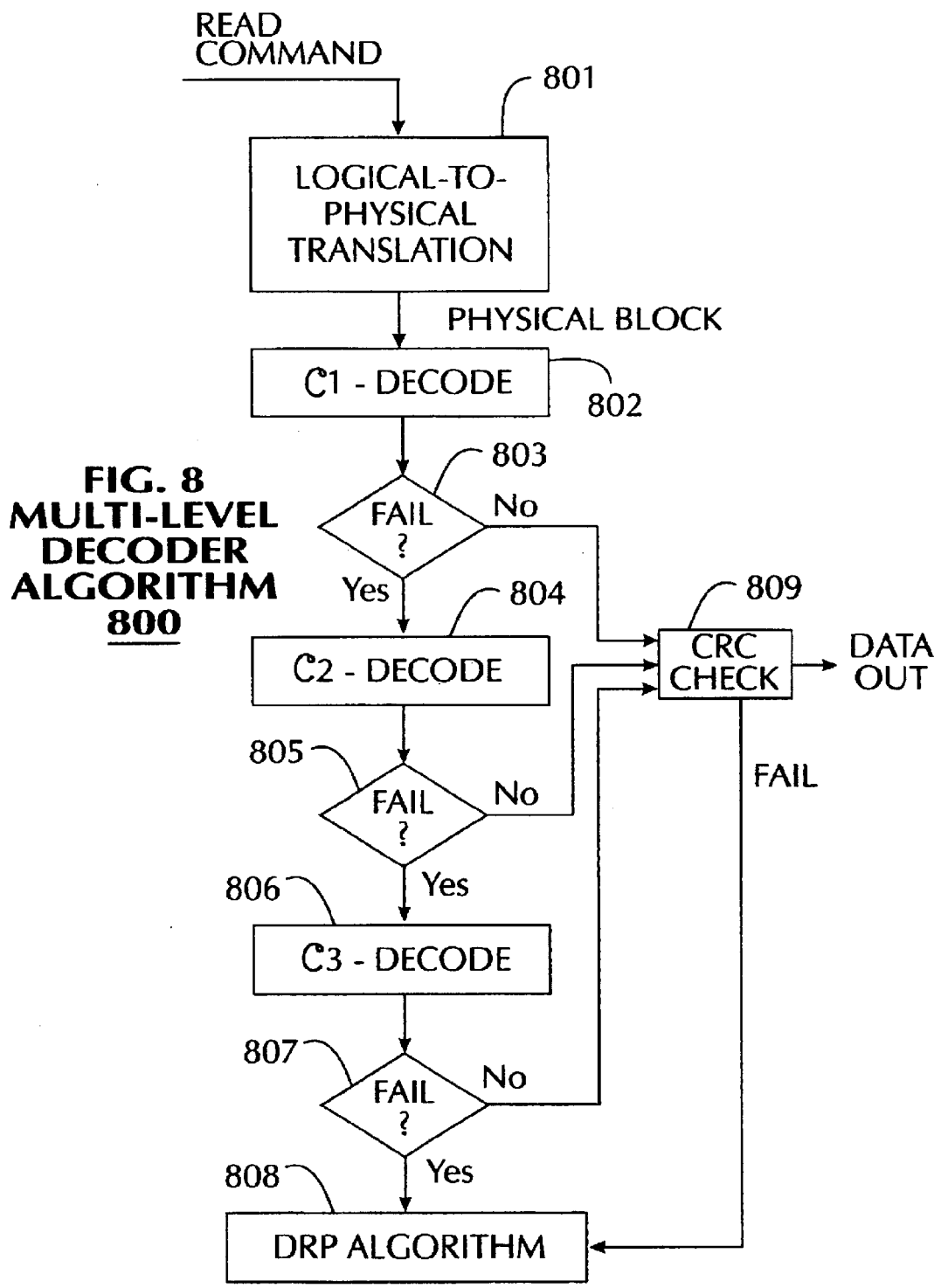

MULTIPLE LEVEL (ML), INTEGRATED SECTOR FORMAT (ISF), ERROR CORRECTION CODE (ECC) ENCODING AND DECODING PROCESSES FOR DATA STORAGE OR COMMUNICATION DEVICES AND SYSTEMS

CROSS-REFERENCE TO RELATED APPLICATIONS

The present application is related to U.S. Pat. No. 5,946,328, issued on Aug. 31, 1999, invented by Cox et al., and assigned to the assignee of the present invention, which is herein incorporated into the present application by this reference.

FIELD OF THE INVENTION

The present invention relates generally to data storage or communication devices and systems, and more particularly to a multiple level (ML), integrated sector format (ISF), error correction code (ECC) encoding and decoding processes for data storage or communication devices and systems.

BACKGROUND OF THE INVENTION

In data storage devices and systems such as, for example, hard disk drives (HDD), the combination of poor write/read conditions and low signal-to-noise ratio (SNR) data detection is likely to cause a mixed error mode of long bursts of errors and random errors in data sectors stored on the disk. Typically, byte-alphabet, Reed-Solomon (RS) codes are used to format the stored sector data bytes into codewords protected by redundant check bytes and used to locate and correct the byte errors in the codewords. Long codewords are more efficient for data protection against long bursts of errors as the redundant check byte overhead is averaged over a long data block. However, in data storage devices, long codewords cannot be used, unless a read-modify-write (RMW) process is used because the present logical unit data sector is 512 bytes long and present computer host operating systems assume a 512 byte long sector logical unit. Each RMW process causes a loss of a revolution of the data storage medium. Losing revolutions of the data storage medium lowers input/output (I/O) command throughput. Therefore, frequent usage of the RMW process becomes prohibitive because it lowers I/O command throughput.

Rather than uniformly adding check bytes to short codewords to correct more random errors in the short codewords, U.S. Pat. No. 5,946,328, issued on Aug. 31, 1999, invented by Cox et al., and assigned to International Business Machines Corporation, discloses a method and means for generating check bytes that are not rigidly attached to a short codeword but are shared by several short codewords in an integrated interleaved Reed-Solomon (RS) Error Correction Coding (ECC) format. Interleaving is a commonly used technique by which the bytes in a data sector are split into several byte streams, each of which is encoded separately, and thus constituting a short Reed-Solomon codeword. A reason for interleaving is to split the errors in a sector among several codewords, thus avoiding the need to build in hardware a very complex Reed-Solomon decoder that can correct a very large number of errors. In the presence of random errors, distinct interleaves may be affected differently, to the effect that a sector can fail on-the-fly (OTF) correction due to an excess of a small number of random errors in one interleave. At low SNR's the probability of such sector failures increases due to an uneven distribution of random errors among the interleaves. U.S. Pat. No. 5,946,328 addresses this specific problem of sector failures due to random errors exceeding the OTF correction capability in one interleave by using shared check bytes in an integrated interleaving two-level ECC format.

In U.S. Pat. No. 5,946,328, the method and means for generating shared check bytes for a two-level ECC among a plurality of interleaves is implemented by performing byte-by-byte summation of all interleaves prior to encoding as well as the repeated byte-by-byte summation of all resulting codewords obtained after encoding. This requires that the interleaved data strings be simultaneously available for byte-by-byte summation, as is the case when the combined interleaves constitute a single data sector. Each individual interleave, as well as their sum, are encoded by Reed-Solomon encoders where the interleave sum codeword has more check bytes than each individual interleave codeword. Summation of the codewords produces a summed interleave codeword that is equally protected against random errors as all the other interleave codewords. The summed interleave codeword is longer, where the additional bytes are potential check bytes for any one interleave codeword with an excess of random errors provided that the remaining interleave codewords do not have errors in excess of the OTF ECC capability.

The combination of low SNR detection and poor write/read conditions may result in both random errors as well as long bursts of byte errors ("mixed error mode") becoming more and more likely at high areal densities and low flying heights, which is the trend in HDD industry. The occurrence of such mixed error mode combinations of random as well as burst errors is likely to cause the 512 byte sector interleaved OTF ECC to fail resulting in a more frequent use of a data recovery procedure (DRP) which involves rereads, moving the head, etc. These DRP operations result in the loss of disk revolutions that causes a lower input/output (I/O) throughput. This performance loss is not acceptable in many applications such as audio-visual (AV) data transfer, for example, which will not tolerate frequent interruptions of video data streams. On the other hand, uniform protection of all single sectors against both random as well as burst errors, at the 512 byte logical unit sector format, would result in excessive and unacceptable check byte overheads. Such check byte overheads also increase the soft error rate due to the increase in linear density of the data.

Long block data ECC, such as 4 K byte physical block comprising eight sectors, for example, could be a solution for some applications, but it would require a change in the operating system standard, unless read-modify-write (RMW) is accepted when writing single 512 byte sectors. Present operating systems are all based on a 512 byte long sector logical unit. RMW is required to update the long physical block check bytes. Thus, when a single 512 byte sector is written, the other sectors in the long block need to be read, the long block check bytes need to be recalculated, and the whole long block is then rewritten. Hence, the RMW causes an I/O throughput performance loss that is generally unacceptable for typical HDD operation.

Therefore, it would be desirable to have an ECC format for a data storage device that has a low sector failure rate for the mixed error mode of random error and burst error, that avoids frequent DRP or RMW use, and that also has an acceptable check byte overhead. Accordingly, there is a need for a multiple level (ML), integrated sector format (ISF), error correction code (ECC) encoding and decoding process for data storage devices and systems or communication devices and systems.

SUMMARY OF THE INVENTION

A method and apparatus for encoding and decoding blocks of multiple sectors of data bytes to detect and correct data bytes in error in each sector.

According to one aspect of the present invention, the method and apparatus generates sector level check bytes for each sector in the block responsive to the data bytes in each sector according to a first level of an error correction code, and generates block level check bytes for a predetermined sector in the block responsive to the sector level check bytes of various sectors, including the predetermined sector, according to at least a second level of the error correction code. The method and apparatus processes the block to detect and correct data bytes in error in each sector within the capability of the sector level check bytes, to detect and correct data bytes in error in the at least two sectors that exceed the correction capability of the sector level check bytes but within the correction capability of the block level check bytes, or to indicate that the data bytes in error in the at least two sectors exceed the correction capability of each of the sector level check bytes and the block level check bytes.

According to another aspect of the present invention, the method and apparatus re-generates the block level check bytes for the at least one sector responsive to the data bytes in error detected in each sector.

According to another aspect of the present invention, the method and apparatus disables the step of generating the block level check bytes when the write command is fragmented and is less than or equal to one multi-sector block of data bytes.

According to another aspect of the present invention, each sector has 512 data bytes and each block has eight sectors.

According to another aspect of the present invention, the blocks represent audio and visual information.

According to another aspect of the present invention, the at least two sectors are adjacent to each other.

According to another aspect of the present invention, a controller for a data storage device receives logical block addresses (LBAs) from a host operating system for each write/read command. The LBAs are translated into physical locations within blocks located on a track of a moving storage medium of a data storage device. The step of generating is controlled when writing data bytes responsive to the LBAs. The step of processing is controlled when reading data bytes responsive to the LBAs.

These and other aspects of the present invention are described in further detail with reference to the following figures and detailed description of the preferred embodiments, and as set forth in the appended claims.

BRIEF DESCRIPTION OF THE DRAWINGS

FIGS. 3A, 3B, 3C and 3D illustrates a method and an apparatus for ML-ISF-ECC encoding for particular examples of N=4 sectors, n=3 levels and N=8 sectors, n=3 levels, in accordance with a preferred embodiment of the present invention.

FIG. 8 illustrates a flowchart describing the multiple level (ML), integrated sector format (ISF), error correction code (ECC) (ML-ISF-ECC) decoding process.

DETAILED DESCRIPTION OF THE PREFERRED EMBODIMENT

Figure 1:
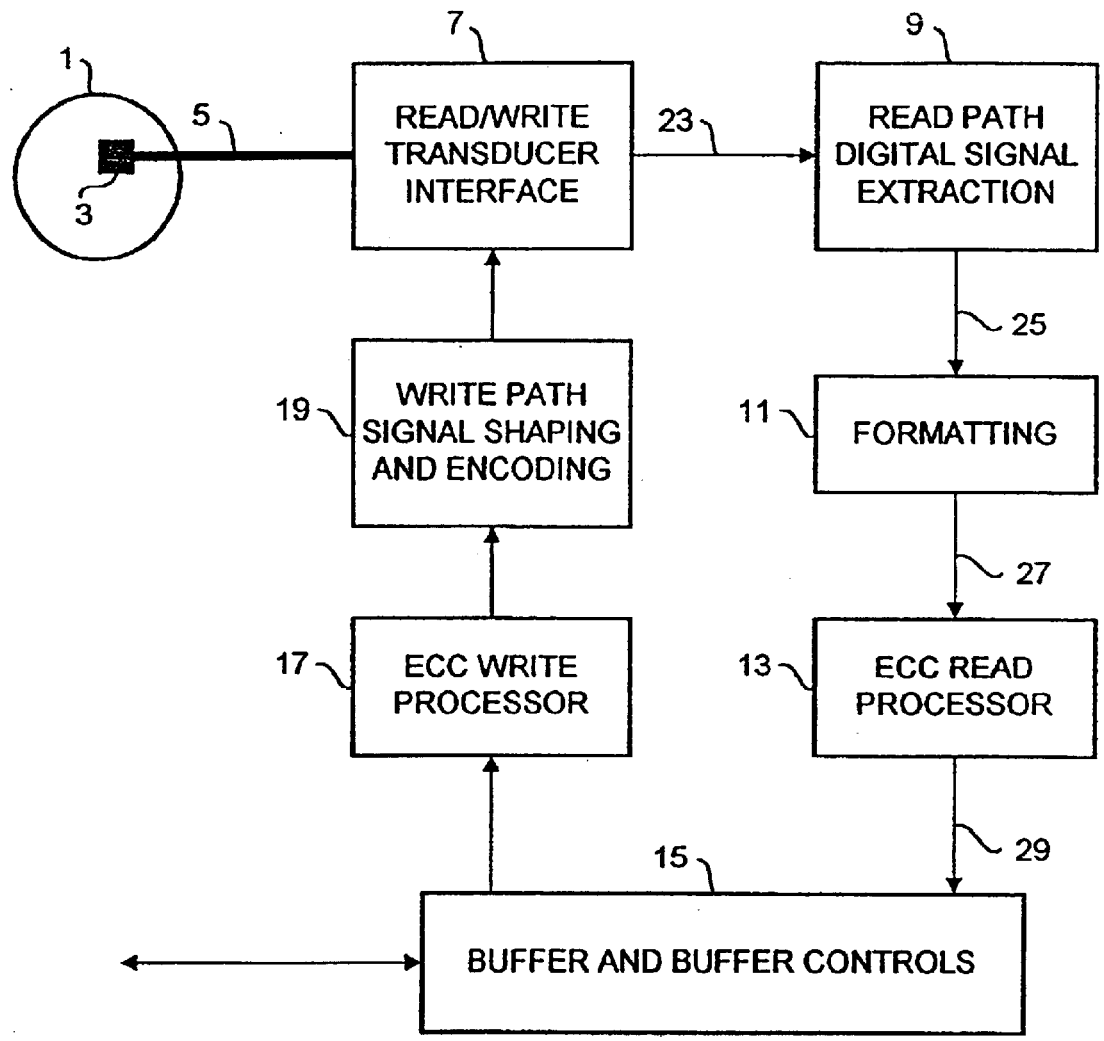
FIG. 1 illustrates a partial data flow for write and read paths of a hard disk drive (HDD) for an on-the-fly (OTF) calculation and appending of check bytes to form and record linear error correction code (ECC) codewords and for detection and correction of linear ECC codewords read from a disk's tracks, in accordance with the prior art.

FIG. 1 illustrates a partial logical view of a disk drive and a portion of the read path and the write path, in accordance with the prior art. A disk drive, also termed a direct access storage device, comprises a cyclically-rotated magnetic disk 1, a radial or axially movable access arm 5 tipped with an electromagnetic transducer 3 for either recording magnetic flux patterns representing sequences of digital binary codewords along any one of a predetermined number of concentric tracks on the disk, or reading the recorded flux patterns from a selected one of the tracks and converting them into codewords.

When sequences of digital binary data are to be written out to the disk 1, they are placed temporarily in a buffer 15 and subsequently processed and transduced along a write path or channel (17, 19, 7, 5, and 3) having several stages. First, a predetermined number of binary data elements, also termed bytes, in a data string are moved from the buffer and streamed through the error correction code (ECC) write processor 17. In processor 17, the data bytes are mapped into codewords drawn from a suitable linear block or cyclic code such as a Reed-Solomon (RS) code, as is well appreciated in the prior art. Next, each codeword is mapped in the write path signal-shaping unit 19 into a run length limited or other bandpass or spectral-shaping code and changed into a time-varying signal. The time-varying signal is applied through an interface 7 and thence to the write element in a magnetoresistive, or other suitable transducer 3, for conversion into magnetic flux patterns.

All of the measures starting from the movement of the binary data elements from buffer 15 until the magnetic flux patterns are written on a selected disk track as the rotating disk 1 passes under the head 3 are synchronous and streamed. For purposes of efficient data transfer, the data is de-staged (written out) or staged (read) a disk sector at a time. Thus, both the mapping of binary data into Reed-Solomon codewords and the conversion to flux producing time-varying signals must be done well within the time interval defining a unit of recording track length moving under the transducer. Typical units of recording track length are equal fixed length byte sectors of 512 bytes.

When sequences of magnetic flux patterns are to be read from the disk 1, they are processed in a separate so called read path or channel (7, 9, 11, and 13) and written into buffer 15. The time-varying signals, sensed by transducer 3, are passed through the interface 7 to a signal extraction unit 9. Here, the signal is detected and a decision is made as to whether it should be resolved as a binary 1 or 0. As these 1's and 0's stream out of the signal extraction unit 9, they are arranged into codewords in the formatting unit 11. Since the read path is evaluating sequences of RS codewords previously recorded on disk 1, then, absent error or erasure, the codewords should be the same. In order to test whether that is the case, each codeword is applied to the ECC read processor 13 over a path 27 from the formatter. Also, the sanitized output from the ECC processor 13 is written into buffer 15 over path 29. The read path must also operate in a synchronous data streaming manner such that any detected errors must be located and corrected within the codeword well in time for the ECC read processor 13 to receive the next codeword read from the disk track. The buffer 15 and the read and write paths may be monitored and controlled by a microprocessor (not shown) to ensure efficacy where patterns of referencing may dictate that a path not be taken down, such as sequential read referencing.

U.S. Pat. No. 5,946,328 describes, by example, encoding three interleaved codewords within a single sector. In the preferred embodiment of the present invention, two interleaved codewords are encoded, for example, according to the teachings of U.S. Pat. No. 5,946,328. The two data byte strings are represented by the polynomials $m_1(x)$ and by $m_2(x)$; whereas, the check bytes shared by the byte-by-byte summation of the pair are denoted by $r_c(x)$. In this polynomial notation, the bytes are represented as the Galois field coefficients of the powers of the variable, where the latter give their actual order or relative location. The encoder generator polynomials for the two level ECC are given by the polynomials in equations (1) and (2), whose roots are consecutive powers of the k=8 Galois field generator.

$$\text{First level } g_1(x) = \prod_{i=0}^{2t_1-1} (x - \alpha^i) \qquad (1)$$

$$\text{Second level } g_2(x) = \prod_{i=0}^{2t_2-1} (x - \alpha^i) \qquad (2)$$

The byte correction capability of the corresponding codewords is $t_1$ and $t_2$. Note that $t_2$ is greater than $t_1$, because the correction capability of the second level is larger than that of the first level. The present description assumes that $t_1=2$ and $t_2=4$ for simplicity and concreteness. The check bytes of the codeword are computed by using equations (3) and (4) and (5).

$$\{m_1(x)+m_2(x)\}x^8 = r_c(x)x^4+r'(x) \bmod g_2(x) \qquad (3)$$

$$m_2(x)x^8+r_c(x)x^4 = r_2(x) \bmod g_1(x) \qquad (4)$$

$$m_1(x)x^8 = r_1(x) \bmod g_1(x) \qquad (5)$$

The two encoded data byte strings ($m_1(x)$ and $m_2(x)$) are shown as follows. Here, 0000 is used to describe four zero bytes.

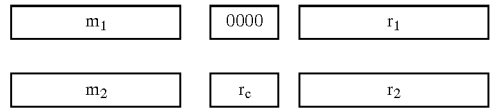

Each codeword has the correction capability of $t_1$. When these two codewords are written to the disk, the 0000 are not written in the first codeword. The four zeros serve an illustrative purpose only because they make it possible to show the alignment of check bytes. According to the preferred embodiment of the present invention, an important feature of the present encoding scheme is that a byte-by-byte summation of two interleaved codewords has correction capability of $t_2$.

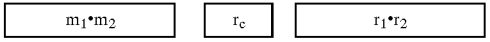

This is easily verified by $r_1(x)+r_2(x)=r'(x)$. Therefore, if the number of errors is less than $t_1$ in one codeword, we can correct up to $t_2$ bytes in error in another codeword.

Figure 2:
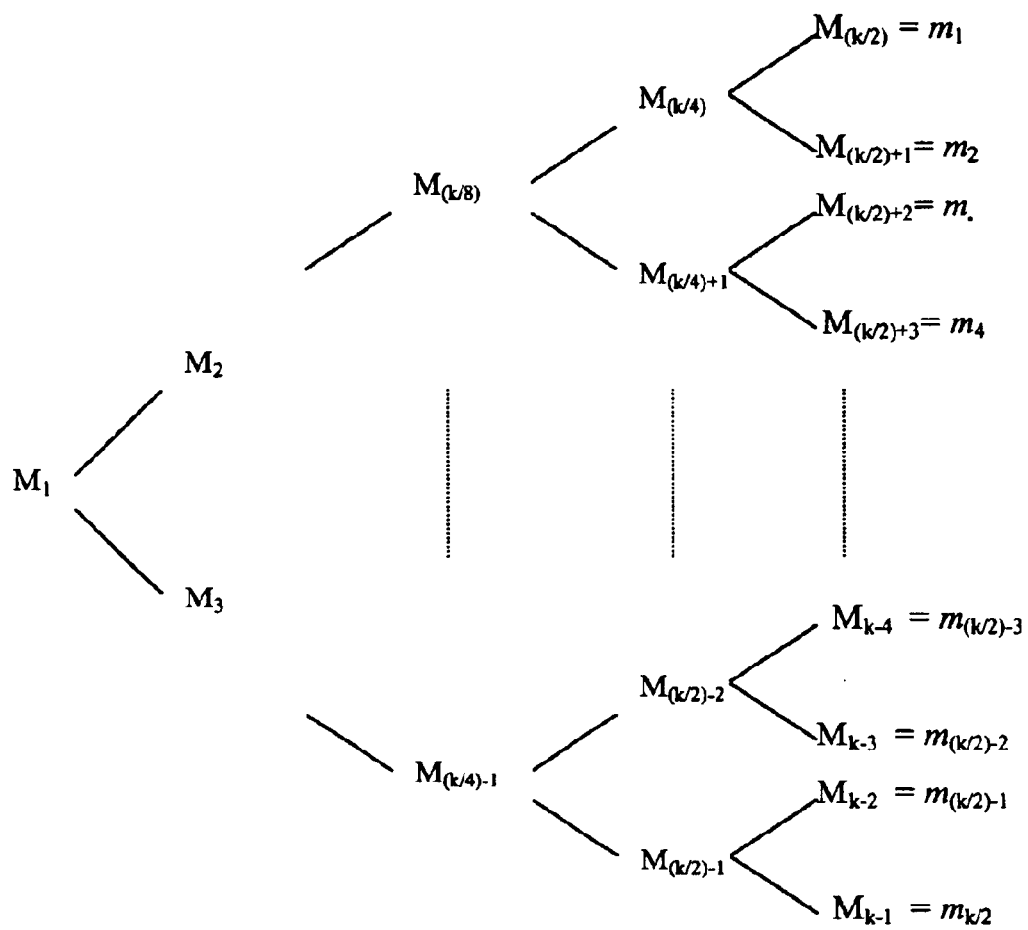
FIG. 2 illustrates a multiple level (ML), integrated sector format (ISF), error correction code (ECC) (ML-ISF-ECC) encoding scheme in the form of a binary tree, in accordance with a preferred embodiment of the present invention.

FIG. 2 illustrates a multiple level (ML), integrated sector format (ISF), error correction code (ECC) (ML-ISF-ECC) encoding scheme in the form of a binary tree, in accordance with a preferred embodiment of the present invention. The binary tree generalizes the coding scheme to $2^{n-1}$ codewords. For example, the binary tree has three levels of coding in the n=3 case. The code generating polynomial of the third level is described in equation (6) as follows.

$$g_3(x) = \prod_{i=0}^{2t_3-1} (x - \alpha^i) \qquad (6)$$

In the preferred embodiment of the present invention, when $t_3=6$ the N=4 sector encoded data byte strings ($m_1(x)$, $m_2(x)$, $m_3(x)$, $m_4(x)$) are shown as follows.

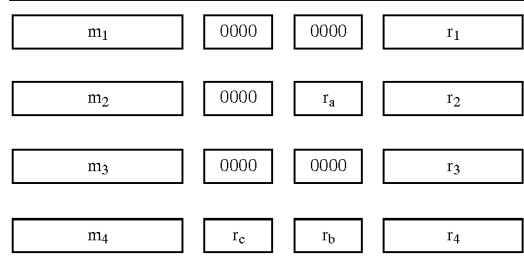

The check bytes of each codeword are computed according to the following equations (7), (8), (9) and (10).

$$\{m_1+m_2+m_3+m_4\}x^{12} = r_c(x)x^8+r'(x)x^4+r''(x) \bmod g_3(x) \qquad (7)$$

$$\{m_3+m_4\}x^{12} + r_c(x)x^8 = r_b(x)x^4+r'''(x) \bmod g_2(x) \qquad (8)$$

$$m_4 x_{12} + r_c(x)x^8 + r_b(x)x^4 = r_4(x) \bmod g_1(x) \qquad (9)$$

$$m_3 x^{12} = r_3(x) \bmod g_1(x) \qquad (10)$$

The computation of $r_1(x)$ and $r_2(x)$ is done in the same manner as described above. Each codeword has correction capability of $t_1$. As in the two level coding example described above, the zeros are eliminated when data is written to the disk. However, the byte-by-byte summation of the two codewords generates a codeword that has correction capability of $t_2$.

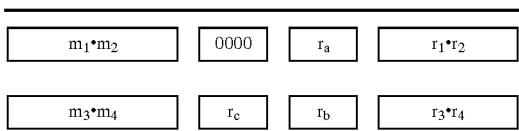

Further, the byte-by-byte summation of all codewords generates a codeword that has correction capability of $t_3$.

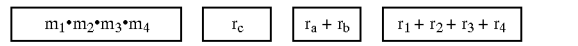

Next, the encoding rule is generalized to an arbitrary number of levels n (k=2^n), as described in FIG. 2, by using the binary tree representation. $M_1 \ldots M_{k-1}$ represent the nodes of the binary tree. The nodes from $M_{(k/2)}$ to $M_{k-1}$ are set to the data strings, for example, $M_{(k/2)}$ to the data string $m_1$, and so on.

The remaining $M_j$ are defined by adding the all $m_i$ in branches connecting to $M_j$. Also, let the correction capability of each level codeword $t_n > t_{n-1} > \ldots > t_2 > t_1$, the generation polynomial $g_n(x), g_{n-1}(x) \ldots, g_2(x), g_1(x)$. Note that $g_k(x)$ can be divided by $g_{k-1}(x)$.

The encoding algorithm is generally stated as described in the following steps.

Step 1: p=1, q=n.
Set $r_i(x)$ to 0 (i=1,2, . . . k−1).
Add 0 of $2t_n$ bytes to all $M_i$ (i=1,2, . . . k−1).
Go to Step 2.
Step 2: If p is odd, $M_p = M_p + r_s(x)$, else nothing. Here s (<p) is integer as $M_s$ directly connect to $M_p$.
Next, divide $M_p$ by $g_q(x)$ and get the remainder r(x).
Finally, $r_p(x)$ is computed by the following equation.

$$r_p(x) = \sum_{k=2t_{p-1}}^{2t_p-1} \text{(Terms of degree } k \text{ in } r_s(x)) + \sum_{k=2t_p}^{2t_n-1} \text{(Terms of degree } k \text{ in } M_p)$$

Step 3: Set p=p+1.
If p=k, then end; else go to Step 4.
Step 4: If p=$2^r$ (r integer), then q=q−1.
Go to Step 2.

FIGS. 3A, 3B, 3C and 3D illustrate a method and an apparatus for ML-ISF-ECC encoding for particular examples of N=4 sectors, n=3 levels (FIGS. 3A and 3B) and N=8 sectors, n=3 levels (FIGS. 3C and 3D), in accordance with a preferred embodiment of the present invention.

Figure 3A:
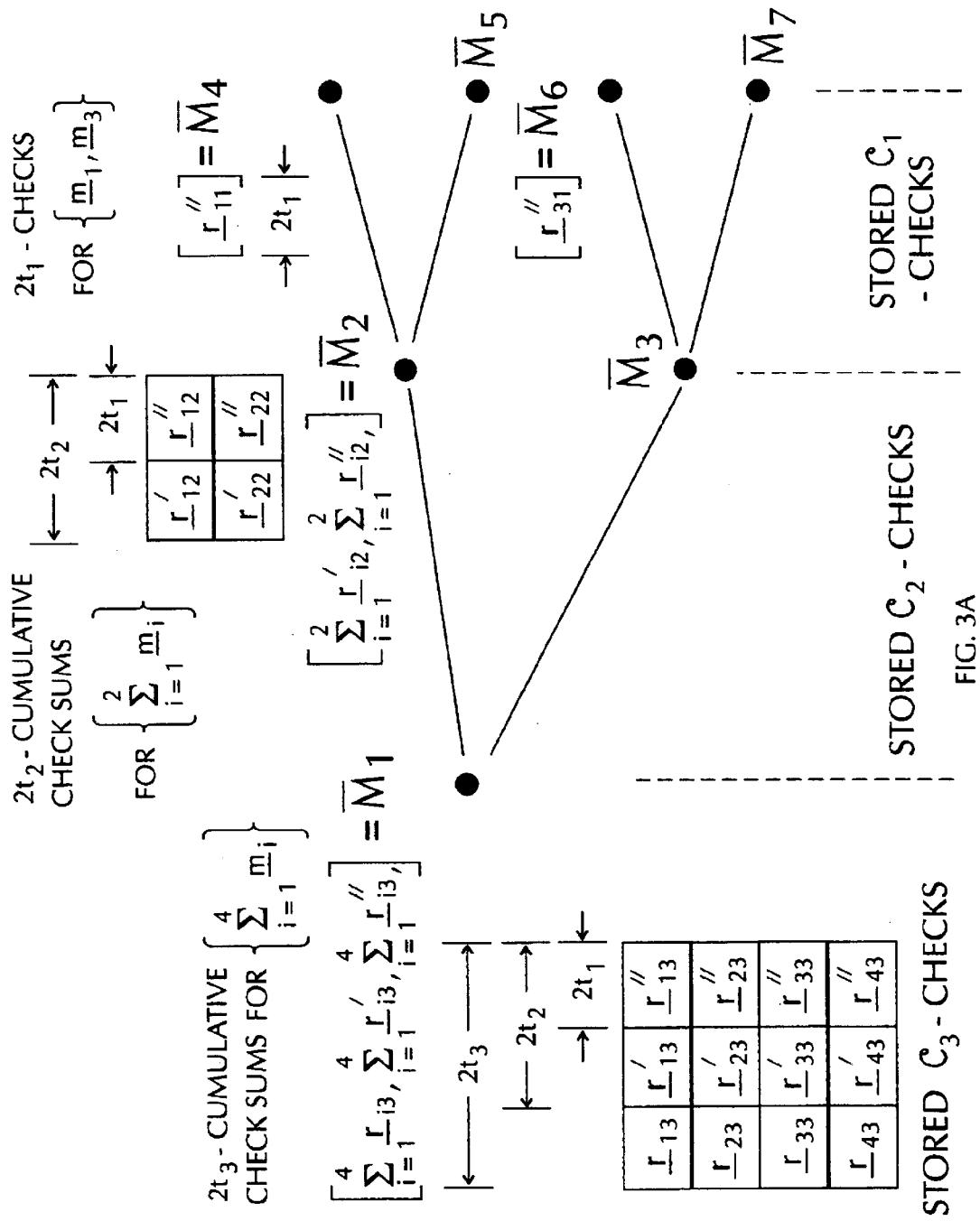

More particularly, FIGS. 3A and 3B illustrate a first example of a four sector integrated format (i.e., N=4) and a three level ECC (n=3). FIG. 3A illustrates, at each node of the binary tree, the registers used to store the cumulative check sums. FIG. 3B illustrates how the content of these registers is combined to generate the integrated format checks using explicit equations for each of the check byte sets.

Figure 3C:
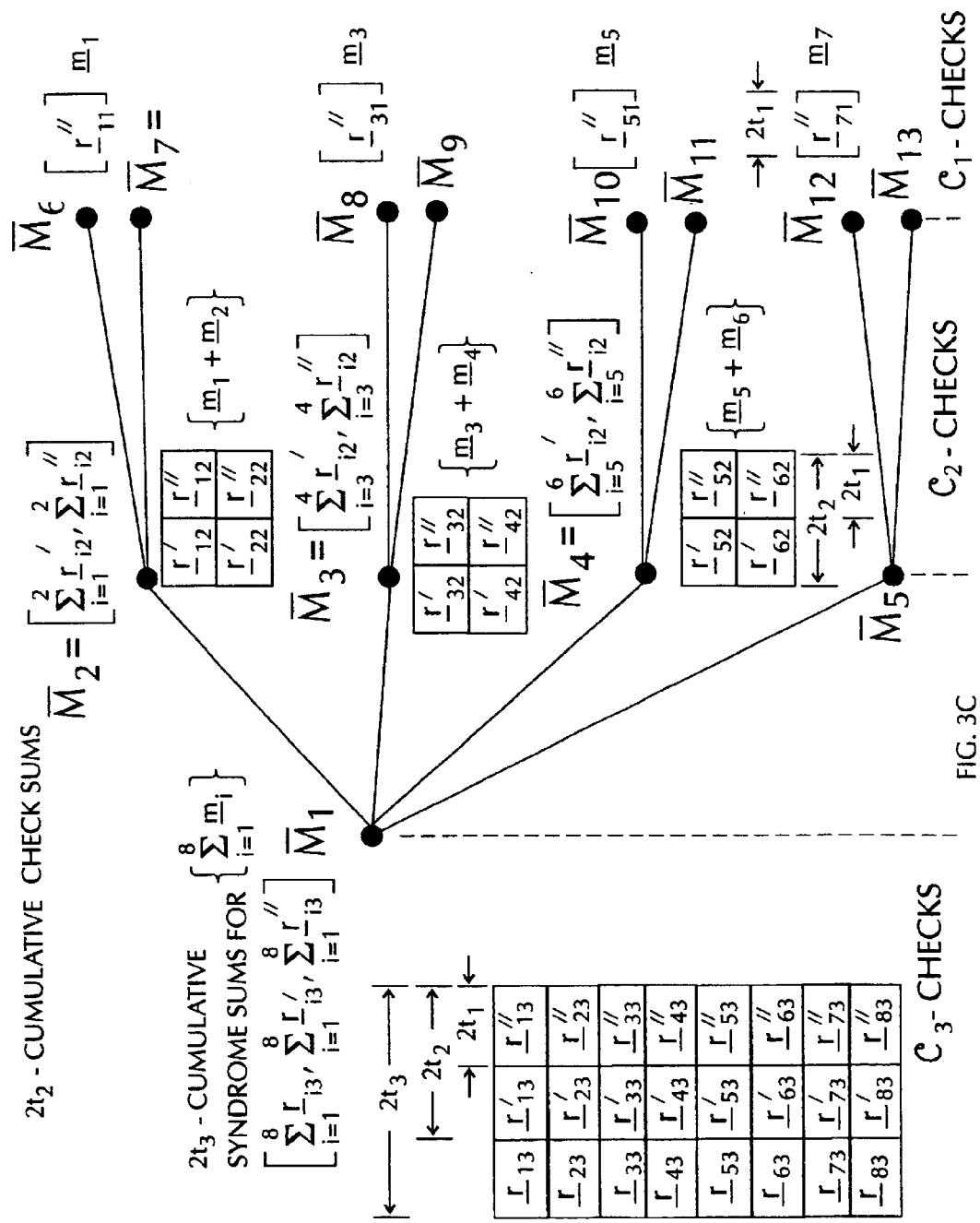
Figure 3D:
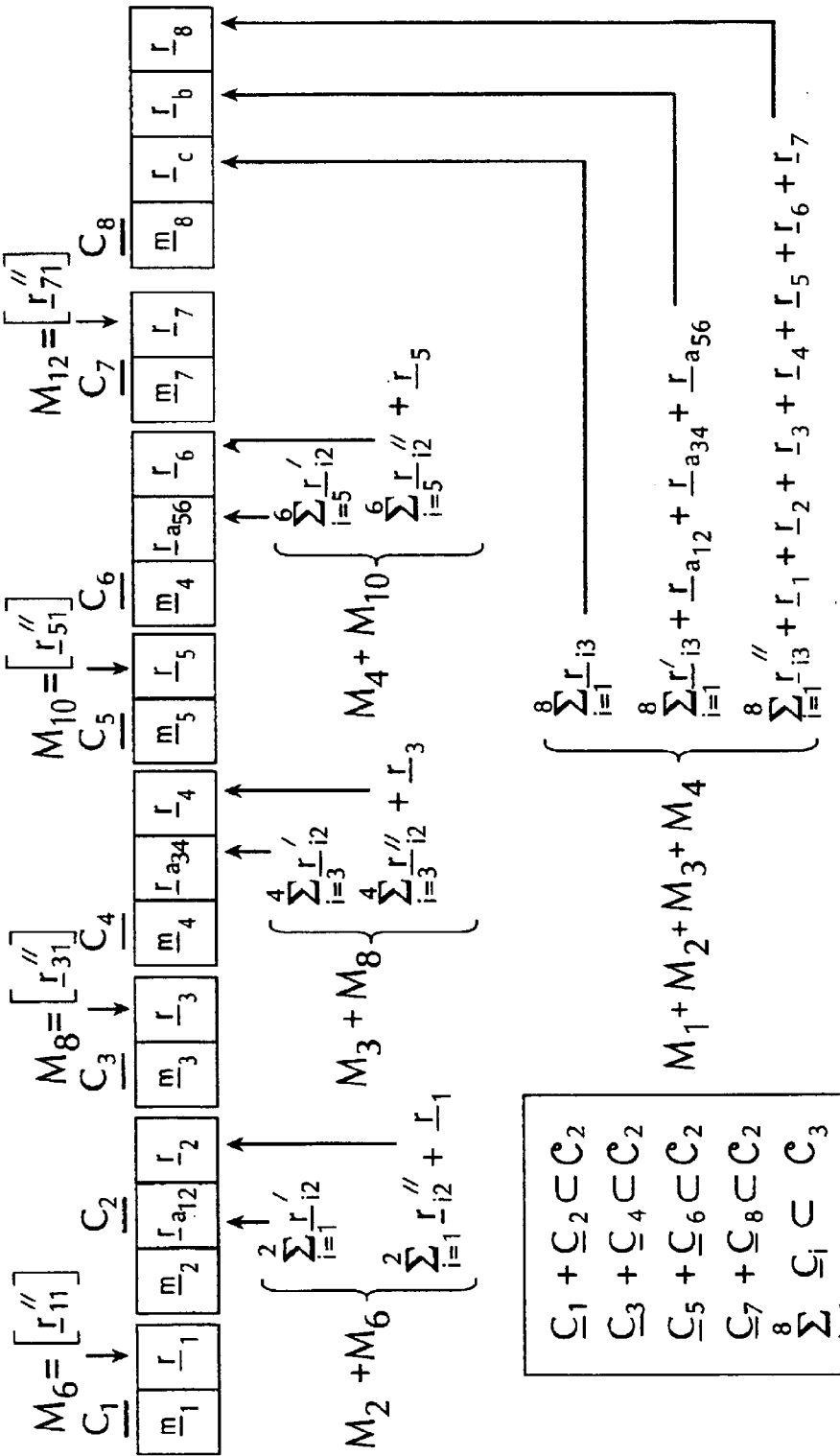

More particularly, FIGS. 3C and 3D illustrate a second example of an eight sector integrated format (i.e., N=8) and a three level ECC (n=3). As in the first example, FIG. 3C illustrates, at each node of the binary tree, the registers used to store the cumulative check sums. Likewise, FIG. 3D illustrates how the content of these registers is combined to generate the integrated format checks using explicit equations for each of the check byte sets.

These two examples are illustrated, without limitation, to demonstrate that the present ML-ISF-ECC method for encoding and decoding is completely general and valid for any number, N, of integrated sectors, for any number, n, of ECC levels, and for any desired pattern for combining sectors within a physical block of N sectors to provide shared check bytes in a ML-ISF-ECC encoding and decoding scheme.

Figure 4:
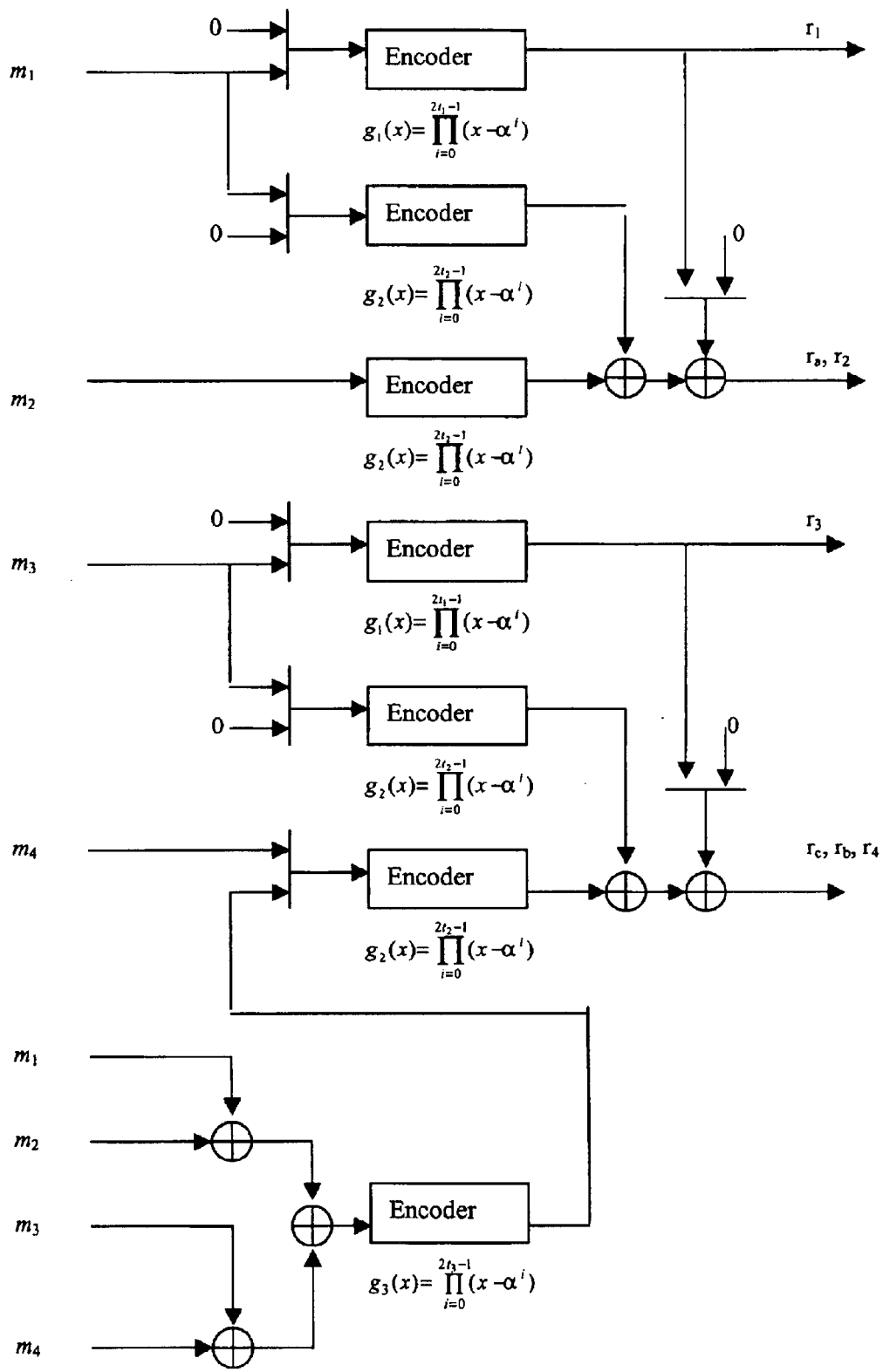
FIG. 4 illustrates a ML-ISF-ECC encoder circuit for a particular example of N=4 sectors, n=3 levels, in accordance with a preferred embodiment of the present invention.

FIG. 4 illustrates a ML-ISF-ECC encoder circuit for a particular example of N=4 sectors, n=3 levels, in accordance with a preferred embodiment of the present invention. The ML-ISF-ECC encoder circuit describes the encoding for the integration of N=4 sectors denoted by {m1,m2,m3,m4} into a n=3 level ECC which is represented by C1=[m1,r1], C2=[m2,ra,r2], C3=[m3,r3] and C4=[m4,rc,rb,r4]. There are three encoders corresponding to the n=3 levels of ECC which are described by the polynomials {g1(x),g2(x),g3(x) }. Unlike the encoder embodiment in U.S. Pat. No. 5,946,328 which generates the multiple level shared check bytes by encoding the byte-by-byte summation of the individual codewords, the ML-ISF-ECC encoder circuit in FIG. 4 does not require that all four data strings be available simultaneously for byte-by-byte summation. Rather, the ML-ISF-ECC encoder circuit in FIG. 4 sums the check bytes of the multiply encoded data strings. This is an important feature of the present invention that renders the ML-ISF-ECC encoder circuit practical. Distinct sectors cannot be made available simultaneously for byte-by-byte summation in a practical manner, without encountering a severe HDD performance degradation.

Ordinarily, the write command issued in micro-code by the host operating system to the HDD controller is a request for continuous data transfer, as the HDD must move the head to the location of the target sector before writing on the disk. The operand of the write command specifies a starting logical block address (LBA) and the number of sectors to be written. If the starting LBA or the ending LBA are integers that are not divisible by N (i.e., the number of sectors integrated within a long physical block) the apparent implication is that the remaining sectors within the block determined by these LBAs must be read to update their shared check bytes, i.e., by using a read-modify-write (RMW) process. This procedure may or may not be acceptable from the overall system performance viewpoint.

Provided the use of RMW is not acceptable then the occurrence of such starting and ending LBA's are the cause of fragmentation that which in the present embodiment of ML-ISF-ECC encoding and decoding scheme can be handled by using only the C1 byte checks in these instances or those multi-sector physical block-level checks that are available within the fragmentation, for example C2-check bytes may be compatible but C3-check bytes may not. As the C1, C2 and C3 check bytes are computed and stored in separate registers, their separate writing use can be easily controlled. The flexibility of the present embodiment makes it possible to avoid the RMW penalty caused by fragmentation, at the expense of maintaining only C1 protection, or multi-sector physical block level protection that is compatible with the fragmented data. Usually, in audio-visual (AV) applications, most of the data transfers are made in large blocks, and most of the data transfer will be C1, C2 and C3 protected. Furthermore, either RMW is acceptable as it is invoked only at a very low frequency, or the fragmented data that is only C1 or C2 protected will typically be a small fraction of the total data stored on the disk.

The write command issued by the host computer is the starting LBA, LBA_1, and the number of sectors, K, to be written sequentially [LBA_1,K]. By logical to physical translation, each LBA identifies an N sector block on the disk, as well as the position of the specific sector within that N block. Provided that this position is the first sector in the N block and that K is an integer multiple of N, the data can be written in the integrated sector format (ISF) with the shared check bytes calculated as illustrated in the example described herein. However, if there is fragmentation either or both at the beginning and the end of the write command, i.e., LBA_1 is not the first sector within the specified N sector block and/or K is not an integer multiple of N, then the stored multiple level cumulative checks may have no purpose. In a fragmented block, the shared checks can be arbitrarily chosen, for example zeros, and only the C1 checks maintain their validity. Depending on the location of the fragmentation within the N sector block, some shared multiple level checks may maintain their validity. A finite state machine (FSM) whose states are determined by [LBA_1,K] preferably controls the ML-ISF-ECC encoder to optimize the preserved number of multiple level check bytes.

Figure 5:
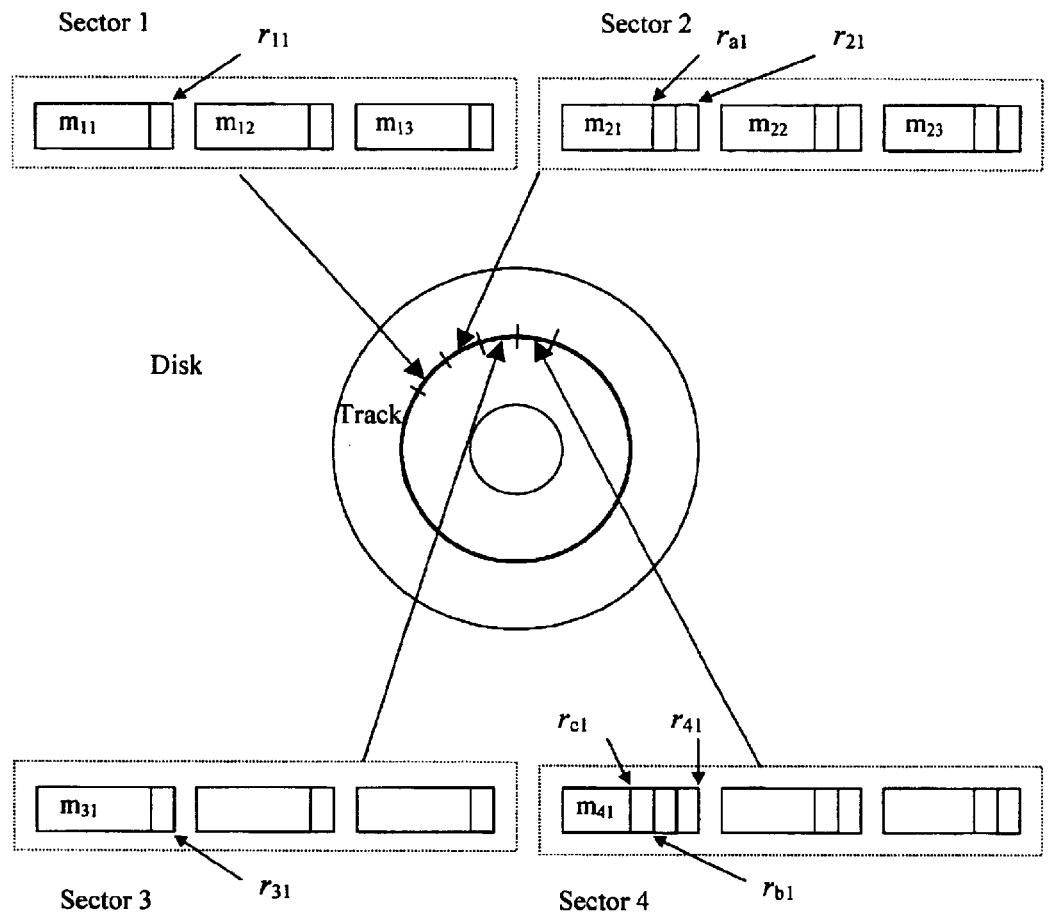
FIG. 5 illustrates a single track physical sector format of a hard disk drive (HDD) for use with the ML-ISF-ECC of FIGS. 2, 3 and 4, in accordance with a preferred embodiment of the present invention.

FIG. 5 illustrates a single-track physical sector format of a hard disk drive (HDD) for use with the ML-ISF-ECC of FIGS. 2, 3 and 4, in accordance with a preferred embodiment of the present invention. In the preferred embodiment of the present invention, multiple sectors (N=4 sectors), integrated by multiple ECC levels (n=3 ECC levels) are located on one track. Alternatively, the sectors may be located on different tracks.

Assuming each sector consists of three interleaves (i.e., 3 codewords), 4 sectors are located on one track. In the preferred embodiment of the present invention, the sectors that are integrated into a long physical block are located adjacent to one another. Let $m_{ij}$(i: sector, j: interleave) represent each codeword (interleave) in the sector. The arrangement of the sectors on the disk is shown in FIG. 5.

Note that the arrangement of each symbols in each interleave (codeword) is not shown in the FIG. 5. As mentioned before, the zeros are not written on the disk. The check bytes ($r_{11}$, $r_{21}$, $r_{31}$, $r_{41}$, $r_{a1}$, $r_{b1}$, $r_{c1}$) are computed by using the same interleave of four sectors ($m_{11}$, $m_{21}$, $m_{31}$, m41). The other check bytes are computed in the same manner.

When data is read from the disk, the operation is the same as a known read operation if the number of errors is equal to or less than $t_1$. In this case, there is no need to read the other integrated sectors. The ML-ISF-ECC data is decoded by combining syndromes as further described with reference to FIG. 6.

Figure 6:
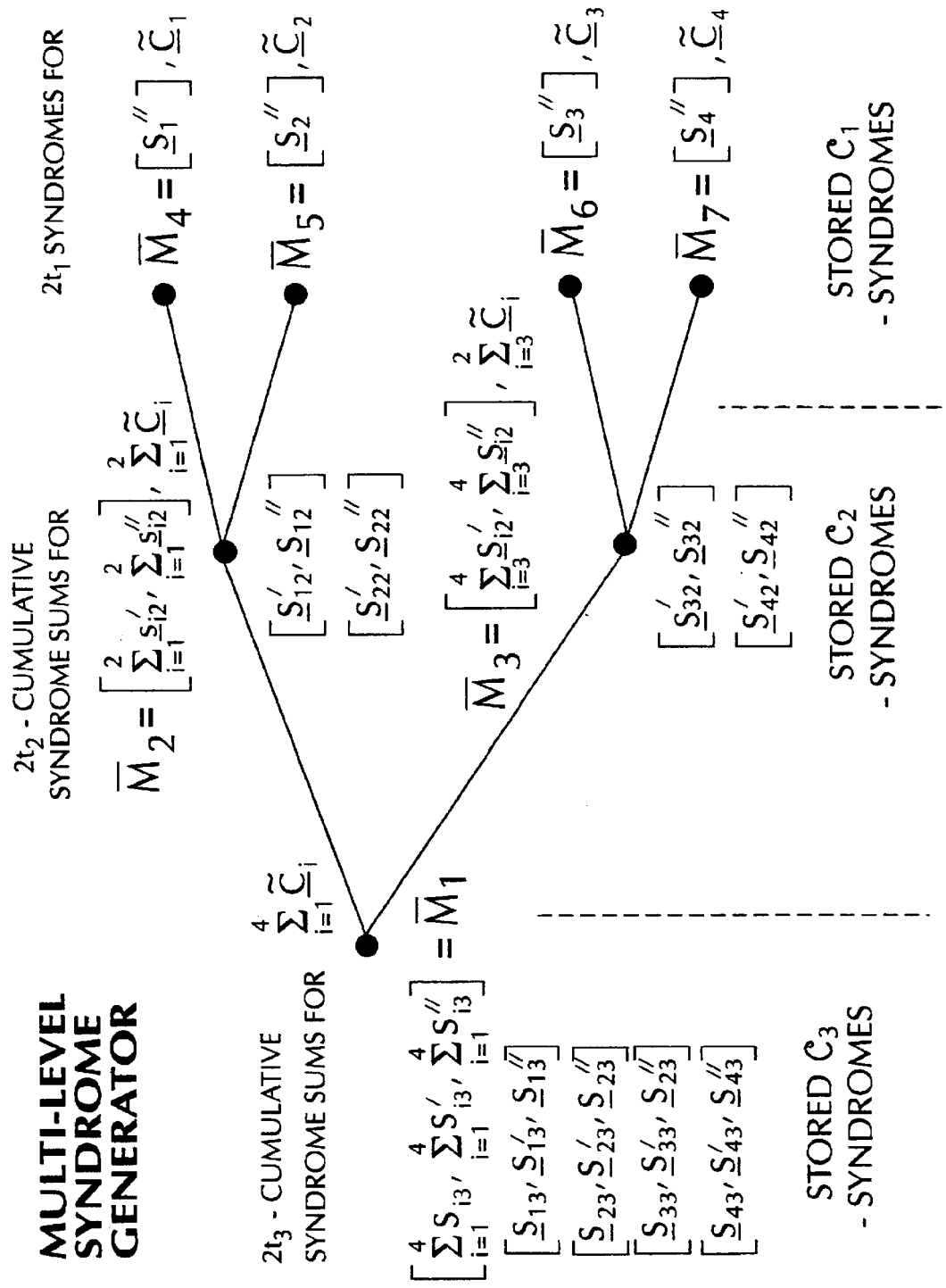
FIG. 6 illustrates a method for generating syndromes for decoding ML-ISF-ECC data, for a particular example of example N=4 sectors, n=3 levels, in accordance with a preferred embodiment of the present invention.

FIG. 6 illustrates a method for generating syndromes for decoding ML-ISF-ECC data, for a particular example of N=4 sectors, n=3 levels of ECC, in accordance with a preferred embodiment of the present invention. The example of the method for generating syndromes for decoding ML-ISF-ECC data corresponds to the encoder described in FIGS. 3A and 3B. The same storage elements used to store check bytes can be used to store the syndromes, as there is a complete correspondence between the two processes. The decoding algorithm generalizes easily for an arbitrary number of sectors, N, and an arbitrary number of ECC levels, n.

The following steps describes the method for generating syndromes for decoding ML-ISF-ECC data.

Step 1: Compute C1 syndromes of codewords (interleaves).

If the syndromes are not zero, the Reed Solomon decoder circuits in the hard disk controller tries to compute the location and values of errors.

Step 2: Check the C1 decoding results.

If all C1 decoding succeeds, then exit; otherwise, choose the codeword for which C1 decoding does not succeed and go to Step 3.

Step 3: Check the C1 decoding status of other sectors (interleaves) that constitute the integrated block of sectors.

If it enables more error correction by using C2 check bytes for the sum of two codewords, go to Step 4; otherwise, go to Step 5.

Step 4: Compute the C2 syndromes for the binary addition of two codewords, which are the bad codeword and its pair codeword corrected by C1 decoding results in binary tree and try decoding (using either hardware and/or software) using the new C2 syndromes.

If decoding succeeds, then end; otherwise, go to Step 5.

Step 5: Check the decoding status again, if it enables more error correction by using C3 check bytes of corresponding to the sum of four codewords, go to Step 6; otherwise, the decoding fails and stop.

Step 6: Compute C3 syndrome for the binary addition of four codewords corrected by C1 decoding results and try decoding (preferably by software, alternatively by hardware) using the new C3 syndromes.

If decoding succeeds, then stop; otherwise, the decoding fails and stop.

Note that the C2 and C3 syndromes for the integrated sector block, in Steps 4 and 6, are updated by using the error locations and error values as calculated by the C1 decoder. Therefore, the higher level C2-ECC and C3-ECC is completely compatible with the single sector C1-ECC.

The proposed format corrects more errors when the sector has both long error burst and random errors (i.e., the mixed error mode) that is common for data storage and communication devices and systems. The advantages of the present invention are described by comparing the following two cases.

Case 1: Prior Art (U.S. Pat. No. 5,946,328)

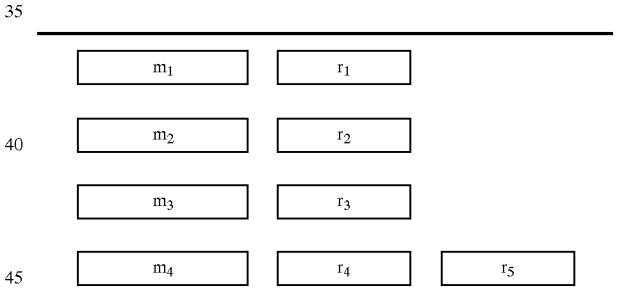

The number of check bytes $r_1$, $r_2$, $r_3$, $r_4$ is 10 bytes and $r_5$ is 8 bytes. The total number of check bytes is 48 bytes.

Case 2: Preferred Embodiment of the Present Invention

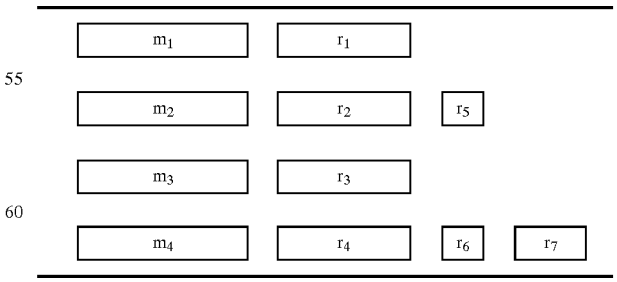

The number of check bytes $r_1$, $r_2$, $r_3$, $r_4$ is 10 bytes, $r_5$, $r_6$ is 2 bytes, $r_7$ is 4 bytes. The total number of check bytes is 48 bytes. Therefore, the overhead due to the number of check bytes in both cases is the same.

Table 1, shown below, illustrates a number of correctable error patterns, in accordance with the prior art. Table 2, shown below, illustrates a number of correctable error patterns, in accordance with the present invention.

The check bytes $r_5$, $r_6$ $r_7$ are used to correct random error. The number of errors in each codeword are denoted by $(e_1,e_2,e_3,e_4)$. For example, (5,6,7,8) means that the first codeword has an error of five bytes, the second codeword has an error of 6 bytes, the third codeword has an error of 7 bytes, and the fourth codeword has an error of 8 bytes.

If both a burst error of 20 bytes and a random error exist together in the mixed error mode, then the number of correctable error pattern is as follows.

Case 1: Prior Art (U.S. Pat. No. 5,946,328)

TABLE 1

| Number | Error bytes/Codeword | Total error bytes |
| --- | --- | --- |
| 4 | (5, 5, 5, 6) | 21 bytes |
| 4 | (5, 5, 5, 7) | 22 bytes |
| 4 | (5, 5, 5, 8) | 23 bytes |
| 4 | (5, 5, 5, 9) | 24 bytes |

Case 2: Preferred Embodiment of the Invention

TABLE 2

| Number | Error bytes/Codeword | Total error bytes |
| --- | --- | --- |
| 4 | (5, 5, 5, 6) | 21 bytes |
| 8 | (5, 5, 5, 7), (5, 6, 5, 6) | 22 bytes |
| 8 | (5, 5, 5, 8), (5, 6, 5, 7) | 23 bytes |
| 8 | (5, 6, 5, 8) | 24 bytes |

As Table 2 shows, the error pattern (5,5,5,9) is not correctable, but can correct for a more probable error pattern like (5,6,5,6), assuming the occurrence of random error.

Actually, to choose the integrated sector format (ISF) and decide on its parameter, an analysis is made of what kind of error types remains uncorrectable after OTF C1 error correction. For example, if the error pattern (5,5,5,9) frequently happens and dominates the error rate, then case 1 is better than case 2 and one could decrease $r_1$, $r_2$, $r_3$, $r_4$ and increase $r_5$ to improve performance. An advantage of the proposed format is to increase the correctable error pattern.

A problem of data integrity in HDDs is to be able to correct long bursts that cause hard errors. Such hard errors can cause the complete failure of the HDD device, requiring its replacement. Because these errors can consist of a large number of bytes, their OTF correction is not practical, both from the viewpoint of check byte overhead as well as from the viewpoint of hardware decoder complexity. However, if the long burst error correlation among adjacent sectors is low, these errors can be corrected by the C3 level ECC. Further, the distribution of check bytes among the C1, C2 and C3 levels can be adjusted to fit various signal patterns, such as the burst length as well as the random error distributions, which is preferably determined by measurement. Hence, the distribution of check bytes among the C1, C2 and C3 levels may be dynamically adjusted by analyzing the signal pattern of a past or a presently processed data burst to better correct for errors in data bursts to be processed in the future. The range of correction choices becomes more complicated as they involve a higher level of correction. In these circumstances, a software implementation on a dedicated microprocessor offers the flexibility necessary in analyzing and correcting complex error patterns.

The C3 level ECC may be considered as part of the data recovery procedure (DRP). Specifically, an initial step in the DRP procedure is designed to minimize the revolution loss for sector recovery. Deeper DRP steps are increasingly revolution consuming and further reduce the I/O throughput. Preferably, the C3 level ECC is designed to minimize the usage of deep DRP steps.

Figure 7:
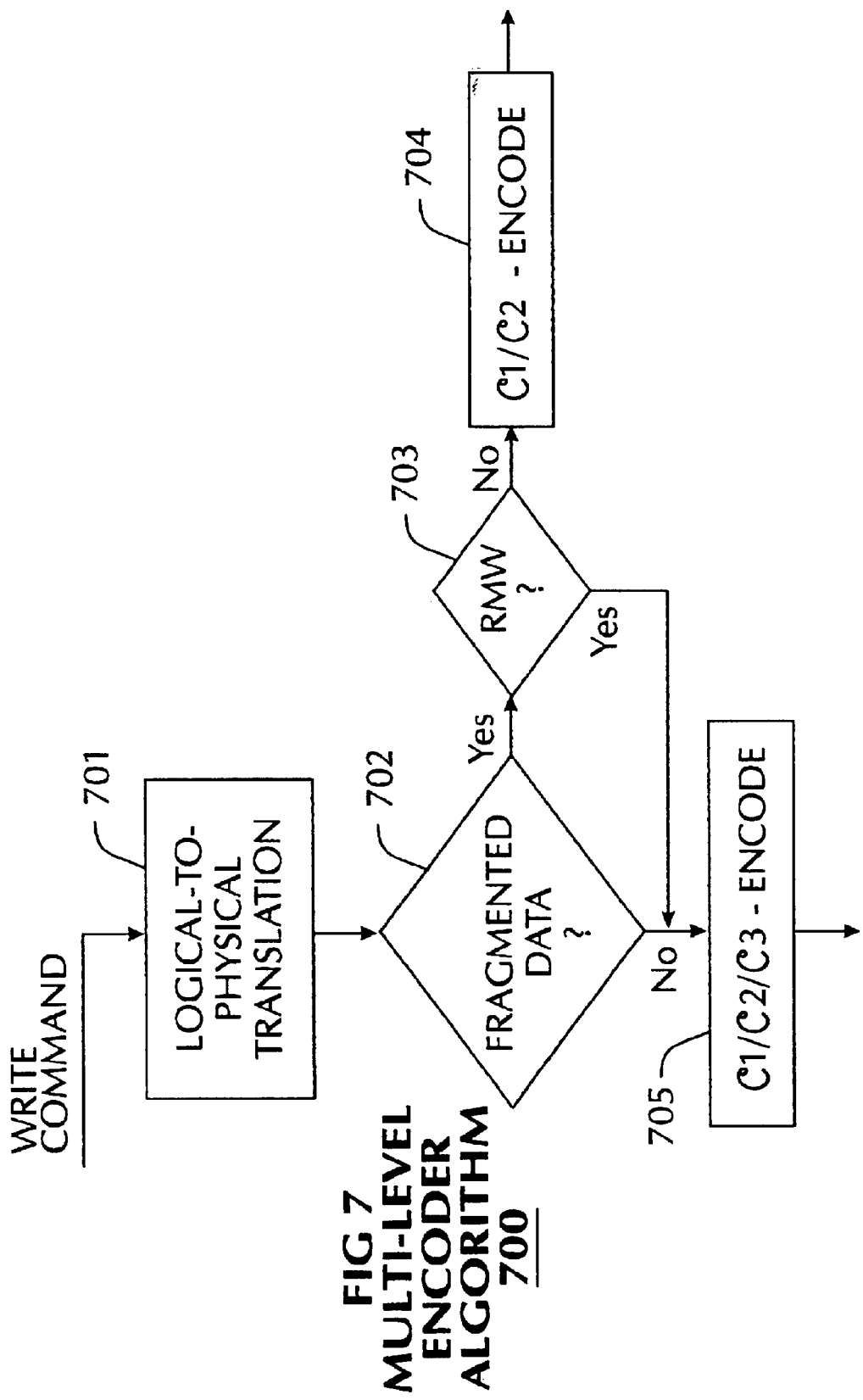
FIG. 7. illustrates a flowchart describing the multiple level (ML), integrated sector format (ISF), error correction code (ECC) (ML-ISF-ECC) encoding process.

FIG. 7 illustrates a flowchart describing the multiple level (ML), integrated sector format (ISF), error correction code (ECC) (ML-ISF-ECC) encoding process 700.

At step 701, the "Logical-to-Physical Translation" describes a write command from a host operating system consisting of an LBA and the number of sectors to be written sequentially. Both the LBA and the number of sectors to be written sequentially are translated into a sector location within an N-sector physical block and a number of adjacent blocks.

At step 702, a determination is made whether the initial and/or final physical block is fragmented. In the preferred embodiment of the present invention, a fragmented block is a block having less than eight sectors of data. For long sequences of information, a fragmented block typically occurs at the beginning and/or end the information to be written. Because the blocks are typically written sequentially, the blocks between the first block and the last block are not fragmented and each has the three level, C1/C2/C3, error protection. Fragmentation is determined by checking whether the first sector within the initial physical block is the sector to be written. Fragmentation determines the initial multi-level encoder state. If there is no fragmentation of the block, then all three preferred levels of error correction can be used, as shown in step 705. If there is some fragmentation, then at least the third level of error correction, C3, cannot be used. The first level of error correction, C1, or both the first and second levels of error correction, C1 and C2, can be used, depending on the amount of fragmentation, as shown in step 704.

At step 703, the read-modify-write (RMW) process optionally may be used when there is a fragmented block to help improve the quality of the encoded data. Although the RMW process is used at the cost of losing a revolution, it provides an effective full C1/C2/C3 error encoding protection of the fragemented block. If RMW is not an acceptable option, the data is encoded with two level, C1/C2, error protection or one level, C1, error protection, as indicated in step 704. Otherwise, at step 705, the encoding process applies the three level, C1/C2/C3, error protection.

FIG. 8 illustrates a flowchart describing the multiple level (ML), integrated sector format (ISF), error correction code (ECC) (ML-ISF-ECC) decoding process 800.

At step 801, the decoding process 800 receives a read command, similar to the write command described above for the encoding process, in the form of a logical block address (LBA) from a host operating system. The decoding process 800 translates the read command from the LBA to a physical location on a moveable storage medium.

At step 802, the decoding process 800 attempts to decode the data using the first level of error protection, C1.

At step 803, the decoding process 800 determines whether or not the attempt at step 802 was successful. In the preferred embodiment of the present invention, at step 803, the decoding process 800 considers the syndromes to determine the location and value of the data bytes in error. If the attempt at step 802 was successful, then the decoding process performs a CRC check at step 809. Otherwise, the decoding process 800 attempts to decode the second level of error protection, C2, at step 804.

At step 804, the decoding process 800 attempts to decode the data using the second level of error protection, C2.

At step 805, the decoding process 800 determines whether or not the attempt at step 804 was successful. In the preferred embodiment of the present invention, at step 804, the decoding process 800 considers the syndromes to determine the location and value of the data bytes in error. If the attempt at step 804 was successful, then the decoding process 800 performs a CRC check at step 809. Otherwise, the decoding process 800 attempts to decode the third level of error protection, C3, at step 806.

At step 806, the decoding process 800 attempts to decode the data using the third level of error protection, C3.

At step 807, the decoding process 800 determines whether or not the attempt at step 806 was successful. In the preferred embodiment of the present invention, at step 806, the decoding process 800 considers the syndromes to determine the location and value of the data bytes in error. If the attempt at step 806 was successful, then the decoding process 800 performs a CRC check at step 809. Otherwise, the decoding process 800 initiates the data recovery process (DRP) algorithm at step 808.

At step 808, the decoding process 800 carries out the DRP algorithm, as is well known in the art.

At step 809, the decoding process 800 performs the CRC check, as is well known in the art. Within the step 809 the decoding process 800, determines whether or not the CRC check was successful. If the CRC check was successful, then the decoding process 800 outputs the decoded data. Otherwise, if the CRC check fails, then the decoding process initiates the DRP algorithm at step 808.

In summary, the present invention provides a solution to the problem of using a physical long block error correction code (ECC) encoding and decoding scheme by providing a low check byte overhead on the hard disk drive (HDD), for data protection against mixed mode errors, while maintaining a 512 byte sector logical unit compatible with present operating systems such as, for example, Microsoft Windows® and Linux®, without necessarily incurring the read-modify-write (RMW) process performance penalty. The solution is most effective for those storage applications that typically involve large block transfers, such as, for example, audio-visual (AV) applications, such as streaming AV data. The solution protects most of the data on the disk against large burst errors while maintaining on-the-fly (OTF) ECC protection against random errors for all of the data on the disk, without incurring the RMW process performance penalty.

The ML-ISF-ECC process is a solution that permits the use of a long block, multiple-sector, multiple level ECC, at a low average check byte overhead, without requiring a change in the operating system standard and which does not require RMW. A fixed number, N, of 512 byte sectors are integrated in a multiple level physical multi-sector block ECC by a multitude of encoders whose check bytes are stored and summed appropriately such as to generate shared multiple level check bytes, protected by the OTF ECC, that can be employed for correction in the integrated long block of sectors, as required by the individual sector failures. Unlike the integrated interleaving technique disclosed in U.S. Pat. No. 5,946,328, where simultaneous byte-by-byte summation of individual short codewords is required for the generation of shared check bytes, the ML-ISF-ECC process generates the ISF shared check bytes among N distinct 512 byte sectors by summing stored check bytes and not the data bytes. The check bytes obtained from encoding each individual sector by a multitude of encoders are stored and summed appropriately after all N integrated sectors have been separately encoded. Furthermore, with the ML-ISF-ECC process there is no limit on the number of levels of correction.

When the number of sectors required to be written on the hard disk by the host operating system, which provides the initial and last logical block address (LBA), is not an integer multiple of N logical 512 byte sector units, the multiple level encoding operation may be partially disabled leaving only those levels of ECC, compatible with fragmentation, enabled. The performance degradation due to RMW is thus avoided at the expense of reducing the ML-ISF-ECC from a multiple level ECC to a first level OTF ECC for those long blocks that are fragmented. Specifically, for AV applications this is an excellent tradeoff as most data transfers involve very large data blocks and thus the fraction of the data not protected by the ML-ISF-ECC process will be very small.

Control of the multiple level encoder during a write operation, as well as the control of the corresponding multiple level syndrome generator during a read operation, are determined by the LBA integers represented by interface bit patterns. The personal computer (PC) host operating system provides the LBA integers to the hard disk drive for each write/read command. In the ML-ISF-ECC process, the LBA integers determines the physical N-sector physical block alignment on the disk, the position of each N-sector physical block on the disk track, as well as the position of a single 512-byte sector within the physical block.

In the preferred embodiment of the present invention, the implementation of a Reed-Solomon encoder and decoder is a matter of design choice, as other encoding and decoding techniques may be used.

While the invention has been described with respect to a disk storage device as an illustrative embodiment thereof, it will be understood that various changes may be made in the method and means herein described without departing from the scope and teaching of the invention. Thus, the principles of this invention also pertain to the detection and correction of errors in linearly error correction encoded long byte strings, such as received from a communication system or the like. In the communication system, the units of information are preferably referred to as packet of information rather than sectors of information, as both sectors and packets represent units of information having predetermined amounts of information.

Hence, while the present invention has been described with reference to various illustrative embodiments thereof, the present invention is not intended that the invention be limited to these specific embodiments. Those skilled in the art will recognize that variations and modifications can be made without departing from the spirit and scope of the invention as set forth in the appended claims.

What is claimed is:

1. A method for encoding and decoding blocks having a predetermined number of sectors of data bytes to detect and correct data bytes in error in each sector of a block, the method comprising the steps of:

(a) generating sector level check bytes for each sector in the block responsive to the data bytes in each sector according to a first level of an error correction code, and except when the write command is fragmented and is less than or equal to one multi-sector block of data bytes, generating block level check bytes for at least one sector in the block responsive to the sector level check bytes of at least two sectors, including the at least one sector, according to at least a second level of the error correction code; and (b) processing the block to detect and correct data bytes in error in each sector within the capability of the sector level check bytes, to detect and correct data bytes in error in the at least two sectors that exceed the correction capability of the sector level check bytes but within the correction capability of the block level check bytes, or to indicate that the data bytes in error in the at least two sectors exceed the correction capability of each of the sector level check bytes and the block level check bytes.

2. A method for encoding and decoding blocks having a predetermined number of sectors of data bytes to detect and correct data bytes in error in each sector of a block, the method comprising the steps of:

(a) generating sector level check bytes for each sector in the block responsive to the data bytes in each sector according to a first level of an error correction code, and generating block level check bytes for at least one sector in the block responsive to the sector level check bytes of at least two sectors, including the at least one sector, according to at least a second level of the error correction code; and (b) processing the block to detect and correct data bytes in error in each sector within the capability of the sector level check bytes, to detect and correct data bytes in error in the at least two sectors that exceed the correction capability of the sector level check bytes but within the correction capability of the block level check bytes, or to indicate that the data bytes in error in the at least two sectors exceed the correction capability of each of the sector level check bytes and the block level check bytes;

(c) receiving logical block addresses (LBAs) from a host operating system for each write/read command, wherein the LBAs are translated into physical locations within blocks located on a track of a moving storage medium of a data storage device;

(d) controlling the step of generating when writing data bytes responsive to the LBAs; and (e) controlling the step of processing when reading data bytes responsive to the LBAs.

3. A method for encoding and decoding blocks having a predetermined number of sectors of data bytes to detect and correct data bytes in error in each sector of a block, wherein each sector has 512 data bytes, wherein the blocks represent audio and visual information, the method comprising the steps of:

(a) receiving logical block addresses (LBAs) from a host operating system for each write command and each read command, wherein the LBAs are translated into physical assignment of each sector to corresponding blocks on tracks on a moving storage medium of a data storage device, wherein an integral multiple of blocks are written on each track;

(b) writing data bytes to the moving storage medium responsive to the LBAs, wherein the step of writing further comprises the step of:

(b1) generating sector level check bytes for each sector in the block responsive to the data bytes in each sector according to a first level of an error correction code, and generating block level check bytes for at least one sector in the block responsive to the sector level check bytes of at least two sectors, including the at least one sector, according to at least a second level of the error correction code;

(c) reading data bytes from the moving storage medium responsive to the LBAs, wherein the step of reading further comprises the step of:

(c1) processing the block to detect and correct data bytes in error in each sector within the capability of the sector level check bytes, to detect and correct data bytes in error in the at least two sectors that exceed the correction capability of the sector level check bytes but within the correction capability of the block level check bytes, or to indicate that the data bytes in error in the at least two sectors exceed the correction capability of each of the sector level check bytes and the block level check bytes;

(d) re-generating the block level check bytes for the at least one sector responsive to the data bytes in error detected in each sector during the step of reading.

4. In a data storage device, an apparatus for encoding and decoding blocks having a predetermined number of sectors of data bytes to detect and correct data bytes in error in each sector of a block, the apparatus comprises:

(a) an encoder for generating sector level check bytes for each sector in the block responsive to the data bytes in each sector according to a first level of an error correction code, and generating block level check bytes for at least one sector in the block responsive to the sector level check bytes of at least two adjacent sectors, including the at least one sector, according to at least a second level of the error correction code; and (b) a decoder for processing the block to detect and correct data bytes in each sector within the capability of the sector level check bytes, to detect and correct data bytes in error in the at least two adjacent sectors that exceed the correction capability of the sector level check bytes but within the correction capability of the block level check bytes, or to indicate that the data bytes in error in the at least two adjacent sectors exceed the correction capability of each of the sector level check bytes and the block level check bytes.

* * * * *